United States Patent [19]

Tanaka et al.

[11] Patent Number: 5,631,696
[45] Date of Patent: May 20, 1997

[54] FILM IMAGE INPUT METHOD

[75] Inventors: Hiroshi Tanaka; Kikuo Otsuka, both of Asaka,, Japan

[73] Assignee: Fuji Photo Film Co., Ltd., Saitama, Japan

[21] Appl. No.: 595,210

[22] Filed: Feb. 1, 1996

[30] Foreign Application Priority Data

Feb. 10, 1995 [JP] Japan ................................ 7-022562

[51] Int. Cl.⁶ ............................ H04N 5/253; H04N 9/47
[52] U.S. Cl. ............................ 348/96; 348/102; 348/105
[58] Field of Search ........................... 348/96, 97, 98, 348/102, 105; 355/67, 69; 358/488, 487, 506, 475

[56] References Cited

U.S. PATENT DOCUMENTS

| | | | |
|---|---|---|---|
| 2,295,000 | 9/1942 | Morse | 348/96 |
| 4,901,161 | 2/1990 | Giovanella | 348/96 |
| 5,412,773 | 5/1995 | Carlucci et al. | 348/97 |
| 5,469,209 | 11/1995 | Gunday et al. | 348/97 |
| 5,528,282 | 6/1996 | Sandor et al. | 348/97 |
| 5,565,912 | 10/1996 | Easterly et al. | 348/96 |

FOREIGN PATENT DOCUMENTS

| | | |
|---|---|---|
| 2276362 | 4/1989 | Japan . |
| 44456 | 4/1990 | Japan . |
| 4311940 | 4/1991 | Japan . |

*Primary Examiner*—Tommy P. Chin
*Assistant Examiner*—Luanne P. Din

[57] ABSTRACT

A width of a illumination light being transmitted through a film is restricted within a distance between frames of the film. The film is transported to a position where only an area between frames is illuminated after the image of one frame is picked up, and a film transport is stopped. Then, the light is diminished or turned off when any operation is not instructed within a first time. Next, the film is transported in such a manner that a middle part of the frame is positioned below or above a photo detector when any operation is not instructed within a second time after the first time has passed, and the film transport is stopped. Then, a magnetic head is pressed against the film and the film is released from being held between the capstan and the pinch roller.

20 Claims, 2 Drawing Sheets

F I G. 1
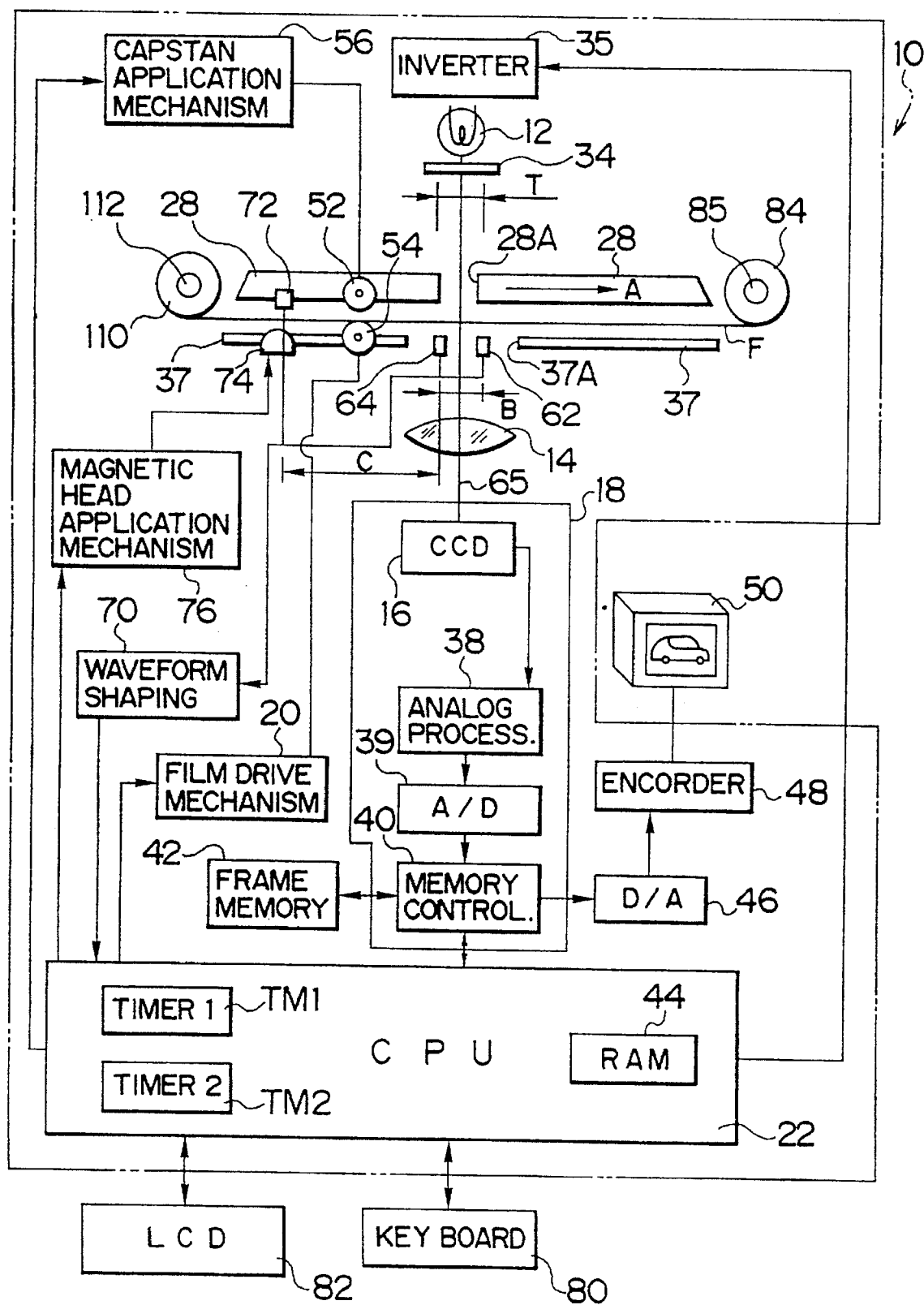

FILM IMAGE INPUT METHOD

BACKGROUND OF THE INVENTION

1. Field of the Invention

The present invention relates to a film image input method and more particularly to a film image input method used for a film scanner which reads out a frame image of developed photographic film by means of a line sensor and processes an image signal in accordance with the picked-up frame image and the method is able to prevent the film from being discolored and prevent a capstan from being deformed.

2. Description of the Related Art

The Japanese Patent Application Laid-open No. 2-276362, the Japanese Patent Application Laid-open No. 4-311940, and the Japanese Utility Model Application Laid-open No. 4-4456 disclose a film image input method which comprises the steps of illuminating by means of a light source a long developed photographic film which is being transported, picking up a illuminated frame image of the film by means of a line sensor such as a CCD, etc., converting the image into an image signal, and applying the image signal to a TV monitor so as to display a frame image.

In one of the conventional film image input methods, an infrared cut filter is provided between a light source and photographic film to cut a heat ray in an infrared area of the illumination light in order to prevent the frame image of the film from being discolored which is caused by the illumination light.

However, in the conventional film image input method, after one frame image is picked up by the line sensor, a film transport is temporarily stops until the pickup for next frame image is started. Therefore, if the operation has not been executed for a long time, the rear end portion of the picked up frame is illuminated by the illumination light for a long time. As a result, there is a problem in that the image on the rear end portion of the frame is discolored by a visible light and the infrared radiation.

Further, the conventional film image input apparatus has a mechanism which transports the film with a pinch roller and a capstan, and the roller for driving the film is normally made of a material such as rubber, etc. Therefore, there is a problem in that the roller tends to be deformed if the capstan is pressed against the pinch roller for a long time.

SUMMARY OF THE INVENTION

The present invention has been developed in view of the above-described circumstances, and has its aim the provision of a film image input method which can prevent the film from being discolored and damaged, and can prevent the rollers for driving the film from being deformed in the case that an operation has not been executed for a long period after the illuminated image is picked up.

To achieve the above-mentioned objects, in a film image input method comprising the step of transporting a long developed photographic film including a plurality of frames; illuminating an image of each frame by a light source; picking up an illuminated image by a line sensor; and generating an output image signal by the line sensor, a width of a illumination light of the light source is restricted to be within a distance between frames of the film and the restricted illumination light is transmitted through the film, and then the film is transported up to a position where only an area between frames of the film is illuminated after the image of one frame is picked up by the line sensor, and a film transport is stopped. According to the invention, even if the light source is continuously being turning on after the image of one frame is picked up, only the area between the frames is illuminated. Therefore, it is possible to prevent the image of the frame from being discolored. Further, according to the preferred embodiment of the present invention, in the case when a predetermined operation is not instructed within a first time (setup time of timer) after the film transport is stopped, the illumination light of the light source is diminished, or the light source is turned off. As a result, it is possible to prevent the image of the frame from being discolored more effectively. Incidentally, there is an advantage in the case of diminishing the light that the time required until the illumination of the light source come to be stable is shorter than the case of turning off the light source.

According to another mode of the present invention, in the film image input method, the film is transported in such a manner that one of a forward end part of the film or a rear end part of the film in which there is no frame is positioned in a pickup position where the line sensor picks up the image on the film in the case when a predetermined operation is not instructed within a first time after the image of one frame has been picked up. Incidentally, it is possible to transport the film in such a manner that the forward end part or the rear end part, which is a nearer position from the present frame of the film is in the pickup position. As a result, the frames of the film are not illuminated, therefore, it is possible to avoid the image of the frame from being discolored. In particular, this mode is very useful in the case that there is no or extremely small non-exposure area between the frames. Also, it is effective to release the film from being held between the capstan and the pinch roller after one of the forward end or the rear end of the film is transported up to the pickup position. Therefore, it is possible to prevent the film from being damaged and to prevent the rollers from being deformed.

Further, according to the present invention, in the film image input method, whole of the photographic film is continuously moved within one frame at a low speed in the case when a predetermined operation is not instructed within a first time after the image of one frame is picked up by the line sensor in order to prevent the illumination light from concentrating on one position. Because the discoloring is not recognized with eyes in the case when the density is change is constant in one frame, one frame of the photographic film is slowly and continuously moved while it is illuminated, so that the whole one frame is equally discolored. As a result, it is possible to prevent the influence of the discoloring from being made clear. Also, the pressing force of the capstan and the pinch roller does not concentrate on one position, therefore, the partial deformation of the rollers can be prevented. Incidentally, the above-mentioned low speed is understood as a speed which is slower than a speed for picking up the illuminated image. This method of the present invention is particularly effective in the case that there is no or extremely small non-exposure area between frames because of the photographic film's standard.

Moreover, the present invention is able to use the photographic film which is housed in and sent out from the film cartridge having a single spool. The photographic film, which is pulled out from the cartridge, may be rewound once to be housed in the film cartridge so that the discoloring of the photographic film and the deformation of the roller can be strictly prevented.

Furthermore, in the film image input method of the present invention, which comprises the step of transporting a long developed photographic film which is held between a capstan and a pinch roller, the film being housed in a film cartridge and including a plurality of frames and a magnetic layer; illuminating an image on each of the frames by a light source; recording and regenerating magnetic information in and from the magnetic layer by a magnetic head; detecting the perforation by means of a perforation detecting means; picking up an illuminated image by a line sensor in accordance with a detection of the perforation; and generating an output image signal by the line sensor, a width of a illumination light of the light source is restricted to be within a distance between frames of the film and the restricted illumination light is transmitted trough the film, and then the film is transported up to a position where only an area between frames of the film is illuminated after the image of one frame is picked up by the line sensor and stopping a film transport. Here, the illumination light of the light source is diminished in the case when a predetermined operation is not instructed within a first time after the film transport is stopped. Further, in the case when a predetermined operation is not instructed within a second time after the first time has passed, the film is transported in such a manner that a middle part of the frame which has been picked up is positioned below or above the perforation detecting means and the film transport is stopped. Then, the film is released from being held between the capstan and the pinch roller. When the capstan and the pinch roller is retracted from the photographic film, the film becomes free, so that it may move. However, even if the film moves, because the perforation detecting means is positioned below or above the vicinity of middle of the frame, there is no concern that the perforation is miscounted at the time of a re-operation. Furthermore, it is possible to press the magnetic head for recording and regenerating magnetic information in the magnetic layer against the film before the capstan and the pinch roller are released. As a result, the miscounting of the perforation can be strictly prevented. Incidentally, it is possible to turn off the light source instead of diminishing the light.

BRIEF DESCRIPTION OF THE DRAWINGS

The exact nature of this invention, as well as other objects and advantages thereof, will be readily apparent from consideration of the following specification relating to the accompany drawings, in which like reference characters designate the same or similar parts throughout the figures thereof and wherein:

FIG. 1 is a block diagram illustrating an embodiment of a film image input apparatus which uses a film image input method of the present invention.

DESCRIPTION OF THE PREFERRED EMBODIMENT

Figure 2:
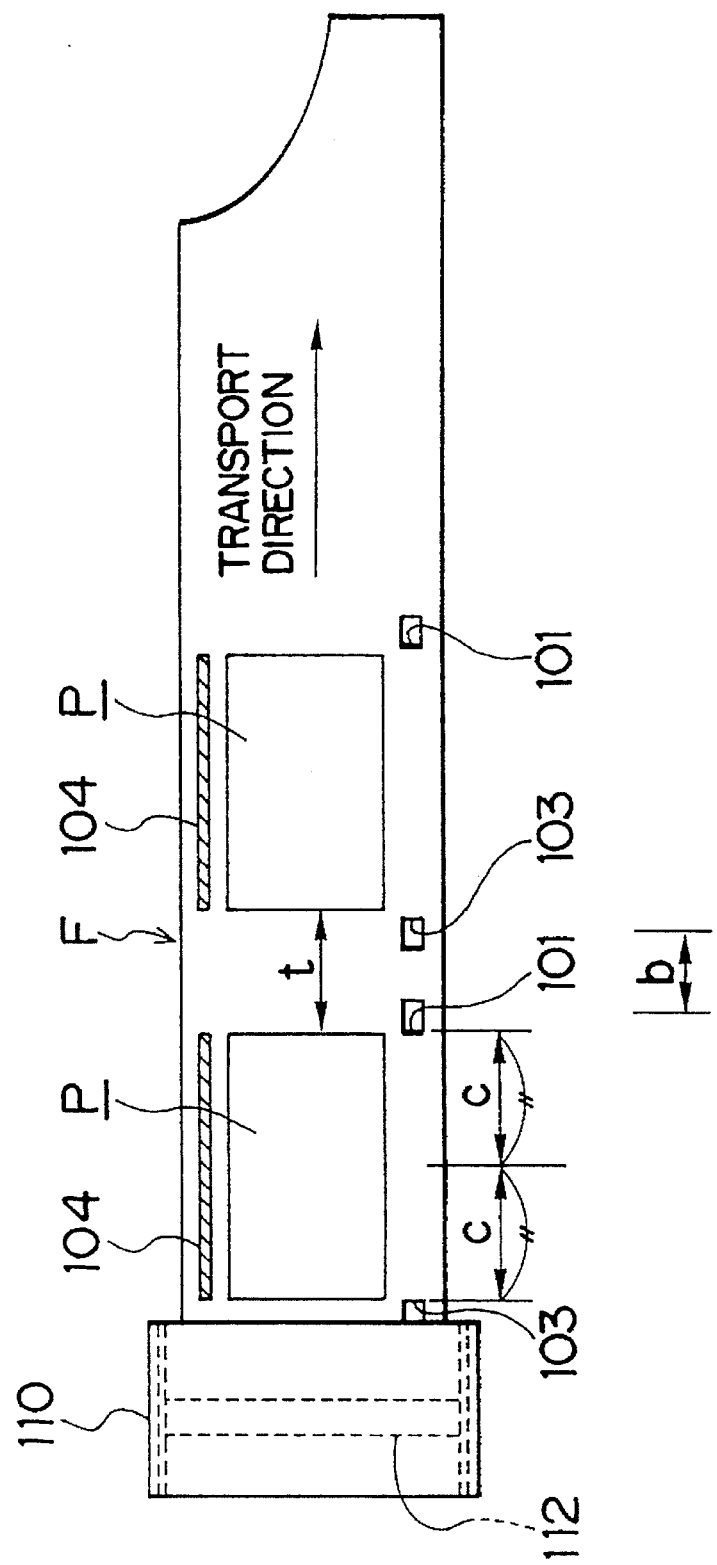
FIG. 2 is a plan view of a photographic film which is applied to the film image input apparatus of FIG. 1.

Detailed description will hereunder be given of the preferred embodiment of a film image input method according to the present invention with reference to the accompanying drawings.

FIG. 1 is a view illustrating an embodiment of a film image input apparatus which uses a film image input method according to the present invention. As shown in FIG. 1, the film image input apparatus 10 mainly comprises a fluorescent tube 12 for illumination, a taking lens 14, a CCD circuit unit 18 including a CCD line sensor 16, a film drive mechanism 20, a CPU 22, and so forth.

FIG. 2 shows a developed photographic film F which is used in the film image input apparatus 10. The film F includes perforations 101 and 103 which indicates a position of each frame, and a magnetic layer 104 is formed on the whole surface or an edge of the photographic film.

Magnetic data such as photographing data for each frame is recorded in the magnetic layer 104 by a camera which has a magnetic head. The film F is wound around a single spool 112 of a film cartridge 110, so that the film F is stored within the film cartridge 110.

The fluorescent tube 12 is disposed in such a manner that its longitudinal direction is perpendicular to a transport direction of the film F, so that it can illuminate the whole width of the photographic film. The fluorescent tube 12 is disposed above a pick-up window 28A which is formed in a guide member 28. The fluorescent light 12 illuminates via an infrared cut filter 34 an image on a frame P of the photographic film F (see FIG. 2) which passes through the pick-up window 28A.

A width T of the pick-up window 28A is narrower than an interval t between frames P of the photographic film F in FIG. 2, so that the illumination light from the fluorescent tube 12 illuminates a range which is narrower than the interval t.

Moreover, the fluorescent light 12 is connected to the CPU 22 via an inverter 35 for light source, and normally emits light, extinguishes, and turn off light in accordance with signal from the CPU 22.

An image light which has been transmitted through the frame P is formed on a light acceptance surface of the CCD line sensor 16 via a pick-up window 37 of a lower guide member 37 and a fixed focus taking lens 14. The photographic film F is transported in a direction of an arrow A of FIG. 1 at a fixed speed by a film drive mechanism 20 while the CCD line sensor 16 is picking up the image on the frame P. An explanation will later be given of the photographic film being driven.

The CCD line sensor 16 is disposed in a direction which is perpendicular to a film transport direction. The image light which is formed on the light acceptance surface of the CCD line sensor 16 is electrically charged in each sensor having filters R, G and B for a predetermined time, and is transduced into signal charge R, G and B, which correspond to the light strength. The signal charge, which is accumulated in the above-mentioned way, is sent to a shift resister by a lead gate pulse of a predetermined cycle which is applied by a CCD drive circuit, and is sequentially read out from the CCD line sensor 16 by a register transfer pulse.

The signal charge, which is read out from the CCD line sensor 16, is clamped by a CDS clamp, and is applied as R, G and B signals to an analog processing circuit 38. The gain, etc. of the R, G and B signals are adjusted in the analog processing circuit 38. The R, G and B signals from the analog processing circuit 38 are converted into digital signals by an A/D converter 39, and are memorized in a frame memory 42 or a RAM (a random access memory) 44 of the CPU 22 via a memory controller 40.

Information for one of frames P, which is memorized in the frame memory 42, is read out by the memory controller 40, and is converted into analog signals by a D/A converter 46. Then, the analog signal is converted into video signals by an encoder 48 so as to be applied to a monitor TV 50.

The film drive mechanism 20 comprises a film supply part (not shown in the drawing) which is engaged with a spool 112 of the film cartridge 110 so as to drive the spool 112 forward and reversely, a film take-up part 84 for taking up the photographic film F which is sent out from the film supply part, a capstan 52 and a pinch roller 54 which are disposed along the film transport path, and so forth. The film drive mechanism 20 is controlled by control signal which is applied by the CPU 22. The photographic film F is held between the capstan 52 and the pinch roller 54 so that it is transported at a predetermined speed.

A capstan application mechanism 56 makes the capstan 52 apply to and retract from the film in accordance with control signal from the CPU 22.

A pair of photo detectors 62 and 64 are disposed in a pick-up window 37A of the guide member 37 and are symmetrical with respect to a pick-up optical axis 65. An interval B between the photo detectors 62 and 64 is equal to an interval b (refer to FIG. 2) between the perforation 101 indicating a rear end of the frame P and the perforation 103 indicating a front end of the frame P. The detectors 62 and 64 detect the perforations 101 and 103 in non-contact condition and send the detection signals to the CPU 22 via a waveform shaping circuit 70.

The CPU 22 controls a timing for picking up the image on the frame P by the CCD line sensor 16 in accordance with the detection signal of the photo detectors 62 and 64.

Another photo detector 72 is disposed away from the photo detector 64 by a distance C so as to face the magnetic head 74. The distance C is half of a distance between two perforations 101 and 103 of the photographic film F (length of the frame) as shown in FIG. 2. The photo detector 72 detects the perforations 101 and 103 in a non-contact condition and sends detection signal to the CPU 22 via the waveform faring circuit 70. The CPU 22 controls a timing for recording and regenerating magnetic data by the magnetic head 74 in accordance with the detection signal of the photo detector 72.

The magnetic head 74 is connected with a magnetic recording and regenerating apparatus (not shown in the drawing). The apparatus is controlled by the CPU 22 and reads out the magnetic data recorded in a magnetic track 104 of the photographic film F and records the magnetic information which is recorded in the RAM 44 of the CPU 22 in the magnetic track 104 of the photographic film F with the magnetic head 74.

The magnetic head application mechanism 76 is connected with the CPU 22, and makes the magnetic head 74 apply to and retract from the photographic film F in accordance with control signal of the CPU 22.

The CPU 22 includes a timer TM1, a timer TM2 and the RAM 44, and appropriately carries out signal-processing for an image signal from the CCD circuit unit 18, and generates a signal used for controlling the inverter 35 of the light source 35, the capstan application mechanism 56, etc. A key board 80 and a liquid crystal display panel 82 are connected to the CPU 22 so that various instructions can be inputted by means of the key board 80 and the liquid crystal display panel 82.

Setup times of the timers TM1 and TM2 are cleared when a predetermined operation is instructed for the film image input apparatus 10. Incidentally, a setup time of the timer TM2 is longer than that of the timer TM1. For example, the setup time of the timer TM1 is 5 minutes, and the setup time of the timer TM2 is 60 minutes. The above-mentioned predetermined operation includes, for example, a manual instruction to regenerate one frame, instruction to feed a frame, instruction to input and edit various pieces of information relating to the length and breadth of the frame, trimming, etc., or instruction of a print order, etc.

Next, an explanation will hereunder be given of a method for controlling the film image input apparatus 10 by the CPU 22.

When the film cartridge 110 is mounted in the film image input apparatus 10 of FIG. 1, the photographic film F stored in the film cartridge 110 is sent out from the cartridge 110 by drive force of a motor (not shown in the drawing). Then, the photographic film F is transported along the upper and lower guide members 28 and 37 while being held between the capstan 52 and the pinch roller 54. The film F passes between the fluorescent tube 12 and the taking lens 14, and is engaged with the take-up spool 85 in a take-up chamber 84.

Next, the fluorescent tube 12 is lighted. Until the fluorescent tube 12 has illuminated stably, an operation of the apparatus is not carried out. After the illumination has been stabilized, the film drive mechanism 20 is driven so that the photographic film F is transported from the film cartridge 110 in the direction of the arrow A. Then the pickup of the image on the first frame of the photographic film F is started. The pickup of CCD line sensor 16 is stopped just after the rear end of the first frame passes the pickup optical axis 65.

After the image of the first frame has been picked up, the photographic film F is continuously transported by the film drive mechanism 20. When the CPU 22 receives a signal indicating that the perforations 101 and 103 of the photographic film F are detected from the CPU 22, the film drive mechanism 20 is made to stopped, so that the transport of the photographic film F is temporarily stopped. As a result, in this embodiment, when the photographic film F is stopped, the fluorescent tube 12 illuminates a substantially middle part between the frame P and the frame P. Furthermore, the frames P, P are light-shielded by the guide member 28, so the fluorescent tube 12 does not illuminate the frames P, P. The same procedure is repeated for a frame P from the second frame onward so that images on all of the frames P can be picked up.

Therefore, according to this embodiment, even if the fluoresce tube 12 continuously illuminates after the image on one of frames is picked up, it is possible to prevent that the frame image is discolored by the illumination light.

An explanation will hereunder be given of the case when the operation of the apparatus is broken after the image on one of frames is picked up and the film transport is stopped.

Even if any operation is not instructed by means of a predetermined key entry after the setup time of the timer TM1 (for example, five minutes) has passed, the following procedures are carried out.

[1] The illumination light of the fluorescent tube 12 is diminished at first. As a result, the amount of the light, which illuminates the photographic film F, is decreased so that the photographic film F can be restrained from being discolored.

[2] Next, the photographic film F is slowly fed until the photo detector 72 detects the perforation 103. When the photo detector 72 detects the perforation 103, the film transport is stopped. At this time, the photo detectors 62 and 64 are positioned below substantially the middle of the length of the frame.

[3] Then, the magnetic head 74 is applied to the photographic film by the magnetic head application mechanism 76, and

[4] the capstan 52 is made to retract from the photographic film F by the capstan application mechanism 56.

Normally, when the capstan 52 is retracted from the photographic film F, the photographic film F which was held by the capstan 52 and the pinch roller 54 is released. As a result, the photographic film freely moves by several millimeters because of a tension of the wound film, so there is the possibility that the perforations 101 and 103 are counted by mistake when the photographic film F is transported again. Taking account the above-mentioned movement of the film F, the procedures [1] –[4] are carried out. That is, the photographic film F is previously moved to a position where there is no possibility that the perforation is not counted by mistake. Further, the magnetic head 74 is pressed against the photographic film F, as a result, it is possible to prevent the film F from moving.

When the operation is instructed again by the key entry in this state, the following procedures are carried out. That is,

[5] The fluorescent tube 12 is made to emit light normally.

[6] The capstan 52 is applied to the photographic film F by the capstan application mechanism 56.

[7] The magnetic head 74 is made to retract from the photographic film F.

[8] After the illumination of the fluorescent tube 12 is stabilized, the operation returns to normal. Incidentally, the fluorescent tube 12 was not completely turned out, so the time required for the illumination to be stabilized is shortened.

On the other hand, if any operation is not instructed by means of a predetermined key entry in above-mentioned state [4] after the setup time of the timer TM2 (for example, 60 minutes) has passed, the following procedures are carried out to be in a stan-by mode which is described later. Incidentally, before proceeding to the stand-by mode, it is possible to provide a step of confirming whether the user desires to proceed the stand-by mode.

[9] The fluoresce tube 12 is completely turned off. As a result, the middle part of the frame is not illuminated, and it is possible to prevent that the frame image is discolored by the illumination light.

[10] Then, the capstan 52 is applied to the photographic film F by the capstan application mechanism 56 so that the photographic film F can be housed in the cartridge 110.

[11] Moreover, the magnetic head 74, which is pressed to the film F to prevent the film F from moving, is made to retract from the photographic film F.

[12] The photographic film F is rewound to be housed in the cartridge 110, and the capstan 52 is made to be retracted after the photographic film is housed (stand-by mode). Incidentally, in the case that the magnetic data has changed, the magnetic data is written in the magnetic layer of the film F when the film F is rewound.

When an operation is instructed again by the key entry in the stand-by mode, the same procedures (from [13] to [17]) are carried out, and then, the instructed operation is carried out. That is,

[13] The fluorescent tube 12 is made to normally emit light.

[14] The film is loaded.

[15] The capstan 52 is applied to the photographic film F by the capstan application mechanism 56.

[16] The stabilization of the illumination of the fluoresce tube 12 is waited for.

[17] After the illumination is stabilized, an index image showing images of all frames is read out at a low accuracy, and photographing condition for each frame is detected (prescanning).

[18] Then the instructed operation is carried out.

In the case that any operation is not instructed by a key entry in the above-mentioned stand-by mode [12] and the ejection is instructed, the ejection is carried out while a normal writing sequence of the magnetic data according to the elect instruction is omitted.

The present invention is not limited to the above-embodiment. In the case when any operation is not instructed within a predetermined time, for example, it is possible to transport the film F up to the forward end portion or the rear end portion of the film where there is no frame. In this case, it is also possible to transport the film up to one of the above-mentioned two portions after Judging which of the two portions is nearer.

Furthermore, in this embodiment, the photo detectors 62, 64 and 72 detect a position where the photographic film stops. However, the present invention is not limited to this. The position can be detected by other mechanical detecting means.

An explanation will hereunder be given of other method for preventing the photographic film from being discolored and to prevent the roller from being deformed.

A mechanical shutter or a liquid crystal shutter, which is not shown in the drawing, is provided between the fluorescent tube 12(light source) and the photographic film F. The shutter is opened only when the image of the photographic film F is picked up, and is closed in the other cases in order to prevent the extra light from being transmitted the photographic film. As a result, it is possible to prevent the photographic film from being discolored.

In another method, after the frame image is picked up, the photographic film is transported at a low speed which is slower than a speed of the picking-up the image in the whole area of one frame to prevent the illuminated position from concentrating on one position. According to this method, the light from the light source continues to illuminate the photographic film F, so the photographic film gradually discolors. However, the photographic film is discolored in the whole of one frame with the density being equal, so the discoloring cannot be recognized with eyes. Therefore, if compared with the case when one point discolors intensively because the photographic film remains stationary, the influence against the frame image is small. Moreover, since the capstan 52 and the pinch roller 54 continue to rotate, the roller can be prevented from being partially deformed. Incidentally, the above-mentioned method is particularly effective in the case that there is no non-exposed area between the frames, or the non-exposed area between the frames is very small.

Likewise, it is possible to illuminate the whole surface of the photographic film F while the film transport is not completely stopped after the frame image is picked up. If the whole surface of the photographic film F is equally discolored, the influence caused by the discoloring cannot be recognized with eyes, and furthermore, the degree of discoloring is equalized. Incidentally, in this method, a window for restricting a width of the light source is not necessarily required.

Furthermore, an accumulating time for exposing each frame may recorded in the magnetic layer 104. In this method, the film is not stopped or tied up during stand-by when a frame of which accumulating exposing time is long, is positioned below the light source.

As has been described above, according to the film image input method of the present invention, the width of the illumination light is restricted to be within a distance between frames of the film by a pick-up window, and then the illumination light is transmitted through the developed photographic film, and after the image of one frame is picked up by the line sensor, the photographic film is transported up to a position where only the area between frames of the photographic film is illuminated by the light source and is stopped. As a result, it is possible to prevent the frame image from being discolored by the illumination light. When a predetermined operation is not instructed within the first time (setup time of timer 1) after the photographic film is stopped, the light source may be diminished or turned off. In this case, only the area between frames of the photographic film is illuminated by the light source, and a heat effect on the frame image is decreased by diminishing or turning off the light. As a result, it is possible to prevent the frame image from being discolored. Incidentally, in the case of diminishing the light, it is also possible to turn off the light after diminishing. As a result, the discolor of the frame image can be prevent more effectively.

Further, according to the present invention, in the case when a predetermined operation is not instructed within the first time, the light source is diminished or turned off at first. Then, the photographic film is moved in such a manner that the perforation detecting means is positioned below a substantially middle portion of the frame and the magnetic head is pressed against the film and the capstan which is applied to the film is released, when any operation is not instructed within a predetermined time after diminishing or turning off the light source. As a result, it is possible to count the perforation properly when the operation is instructed again, and it is possible to effectively prevent the film from being discolored. Moreover, the capstan is not continuously pressed against the pinch roller for a long time. As a result, it is possible to prevent the capstan and the pinch roller being deformed.

Furthermore, according to the present invention, in the case when the predetermined operation is not instructed within the first time after the transport of the photographic film is stopped, the film is transported up to the forward end portion or the rear end portion of the film where there is no frame. As a result, it is possible to prevent the image of the frame from being discolored.

Further, after the frame image is picked up, the photographic film is transported within one frame at a low speed to prevent the illuminated position from concentrating on one position. As a result, the discoloring does not concentrate on one position, so the discoloring of the film and the deformation of the rollers can be prevented. This method is particularly effective in the case that there is no non-exposed area between the frames, or the non-exposed area between the frames is very small.

Furthermore, it is possible to rewind the film within the film cartridge in accordance with the time in which any operation is not instructed in order to prevent the film from being discolored and to prevent the rollers from being deformed. As a result, an effective stand-by can be achieved.

Incidentally, by combining the above-described mode, the effective stand-by can be also achieved. Moreover, by diminishing or turning off the light source, lifetime of the light source tube can be elongated. Further, in the case that any operation is not instructed for long time, and the interval between the pre-scanning (getting a pickup condition for line sensor) and the main-scanning (getting high-quality image of one frame) is long, it is possible to prevent an image deterioration which is caused by a light mount changing.

It should be understand, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film image input method comprising the step of transporting a long developed photographic film including a plurality of frames; illuminating an image of each frame by a light source; picking up an illuminated image by a line sensor; and generating an output image signal by the line sensor, the method comprising the steps of:

restricting a width of a illumination light of the light source which is transmitted through the film to be within a distance between frames of the film;

transporting the film up to a position where only an area between frames of the film is illuminated after the image of one frame is picked up by the line sensor; and stopping a film transport.

2. The film image input method according to claim 1, further comprising the step of:

diminishing the illumination light of the light source in the case when a predetermined operation is not instructed within a first time after the film transport is stopped.

3. The film image input method according to claim 1, further comprising the step of:

turning off the light source in the case when a predetermined operation is not instructed within a first time after the film transport is stopped.

4. The film image input method according to claim 1, further comprising the step of:

transporting one of a forward end part of the film or a rear end part of the film where there is no frame up to a pickup position where the line sensor picks up the image on the film in the case when a predetermined operation is not instructed within a first time after the film transport is stopped.

5. The film image input method according to claim 1, wherein the film is transported from a film cartridge, further comprising the step of:

housing the film in the cartridge temporarily in the case when a predetermined operation is not instructed within a first time after the film transport is stopped.

6. The film image input method according to claim 2, further comprising the step of:

turning off the light source in the case when a predetermined operation is not instructed within a second time after the first time has passed.

7. The film image input method according to claim 6, further comprising the step of:

transporting one of a forward end part of the film or a rear end part of the film where there is no frame up to a pickup position where the line sensor picks up the image on the film in the case when a predetermined operation is not instructed within a third time after the second time has been passed.

8. The film image input method according to claim 7, wherein the film is transported from a film cartridge, further comprising the step of:

housing the film in the cartridge temporarily in the case when a predetermined operation is not instructed within a forth time after the third time has been passed.

9. A film image input method according to claim 2, wherein a perforation is provided for each frame, and the film is transported with being held by a capstan and a pinch roller, further comprising the step of:

detecting the perforation by means of a perforation detecting means;

starting the pick-up of the illuminated image in accordance with a detection of the perforation;

transporting a middle part of the frame up to a vicinity of the perforation detecting means in the case that a predetermined operation is not instructed within a second time after the first time has been passed;

stopping a film transport; and releasing the film from being held between the capstan and the pinch roller.

10. The film image input method according to claim 9, wherein the film is transported from a film cartridge, further comprising the step of:

housing the film in the cartridge temporarily in the case when a predetermined operation is not instructed within a third time after the second time has been passed.

11. A film image input method according to claim 6, wherein a perforation is provided for each frame, and the film is transported with being held by a capstan and a pinch roller, further comprising the step of:

detecting the perforation by means of a perforation detecting means;

starting the pick-up of the illuminated image in accordance with a detection of the perforation;

transporting a middle part of the frame up to a vicinity of the perforation detecting means in the case that a predetermined operation is not instructed within a third time after the second time has been passed;

stopping a film transport; and releasing the film from being held between the capstan and the pinch roller.

12. The film image input method according to claim 11, wherein the film is transported from a film cartridge, further comprising the step of:

housing the film in the cartridge temporarily in the case when a predetermined operation is not instructed within a forth time after the third time has been passed.

13. The film image input method according to claim 11, further comprising the steps of:

providing a magnetic head for recording and regenerating magnetic information in and from a magnetic layer provided for the film; and pressing the magnetic head against the film before releasing the film.

14. The film image input method according to claim 4, wherein the film is transported from a film cartridge, further comprising the step of:

housing the film in the cartridge temporarily in the case when a predetermined operation is not instructed within a second time after the first time has passed.

15. A film image input method comprising the step of transporting a long developed photographic film which is held between a capstan and a pinch roller, the film including a plurality of frames; illuminating an image of each frame by a light source; picking up an illuminated image by a line sensor; and generating an output image signal by the line sensor, the method comprising the steps of:

transporting one of a forward end part of the film or a rear end part of the film where there is no frame up to a pickup position where the line sensor picks up the image on the film in the case when a predetermined operation is not instructed within a first time after the image of one frame is picked up by the line sensor; and releasing the film from being held between the capstan and the pinch roller after one of the forward end or the rear end of the film is transported up to the pickup position.

16. The film image input method according to claim 15 wherein the film is transported from a film cartridge, further comprising the step of:

housing the film in the cartridge temporarily in the case when a predetermined operation is not instructed within a second time after the first time has passed.

17. A film image input method comprising the step of transporting a long developed photographic film which is held between a capstan and a pinch roller, the film including a plurality of frames, a perforation being provided for each frame; illuminating an image on each of the frames by a light source; detecting the perforation by means of a perforation detecting means; picking up an illuminated image by a line sensor in accordance with a detection of the perforation; and generating an output image signal by the line sensor, the method comprising the steps of:

transporting a middle part of the frame up to a vicinity of the perforation detecting means in the case that a predetermined operation is not instructed within a first time after the image of one frame is picked up by the line sensor;

stopping a film transport; and releasing the film from being held between the capstan and the pinch roller.

18. The film image input method according to claim 17, further comprising the steps of:

providing a magnetic head for recording and regenerating magnetic information in and from a magnetic layer provided for the film; and pressing the magnetic head against the film before releasing the film.

19. The film image input method according to claim 15 wherein the film is transported from a film cartridge, further comprising the step of:

housing the film in the cartridge temporarily in the case when a predetermined operation is not instructed within a second time after the first time has passed.

20. A film image input method comprising the step of transporting a long developed photographic including a plurality of frames; illuminating an image of each frame by a light source; picking up an illuminated image by a line sensor; and generating an output image signal by the line sensor, the method comprising the steps of:

moving the photographic film continuously within one frame at a low speed in the case when a predetermined operation is not instructed within a first time after the image of one frame is picked up by the line sensor in order to prevent an illumination position from concentrating at one position.

* * * * *